US006954819B2

(12) United States Patent
Ng

(10) Patent No.: US 6,954,819 B2
(45) Date of Patent: Oct. 11, 2005

(54) PERIPHERAL BUS SWITCH TO MAINTAIN CONTINUOUS PERIPHERAL BUS INTERCONNECT SYSTEM OPERATION

(75) Inventor: Yiu-Keung Ng, Monterey Park, CA (US)

(73) Assignee: StorCase Technology, Inc., Fountain Valley, CA (US)

( * ) Notice: Subject to any disclaimer, the term of this patent is extended or adjusted under 35 U.S.C. 154(b) by 652 days.

(21) Appl. No.: 10/040,424

(22) Filed: Jan. 9, 2002

(65) Prior Publication Data

US 2003/0131177 A1 Jul. 10, 2003

(51) Int. Cl.[7] .............................................. G06F 13/20
(52) U.S. Cl. ...................................... 710/313; 710/9
(58) Field of Search ........................ 710/313, 9, 104; 714/5, 11, 43

(56) References Cited

U.S. PATENT DOCUMENTS

| | | | | |
|---|---|---|---|---|
| 4,668,465 A | * | 5/1987 | Boomgaard et al. | 376/216 |
| 5,091,847 A | * | 2/1992 | Herbermann | 714/3 |
| 5,140,691 A | * | 8/1992 | Austruy et al. | 714/10 |
| 5,146,401 A | * | 9/1992 | Bansal et al. | 700/9 |
| 5,175,822 A | * | 12/1992 | Dixon et al. | 710/9 |
| 5,740,386 A | * | 4/1998 | Miller et al. | 710/306 |
| 6,104,963 A | * | 8/2000 | Cebasek et al. | 700/86 |
| 6,148,348 A | * | 11/2000 | Garnett et al. | 710/14 |
| 6,243,829 B1 | * | 6/2001 | Chan | 714/7 |
| 6,320,408 B1 | * | 11/2001 | Kwong | 326/31 |
| 6,356,979 B1 | * | 3/2002 | Sicola et al. | 711/114 |
| 6,678,721 B1 | * | 1/2004 | Bell | 709/209 |

FOREIGN PATENT DOCUMENTS

| | | | | |
|---|---|---|---|---|
| EP | 240667 A2 | * | 10/1987 | G06F/15/16 |
| EP | 287301 A2 | * | 10/1988 | G06F/13/12 |
| EP | 288648 A1 | * | 11/1988 | G06F/11/20 |
| JP | 04304737 A | * | 10/1992 | H04L/12/40 |

* cited by examiner

Primary Examiner—Paul R. Myers
(74) Attorney, Agent, or Firm—Morland C. Fischer

(57) ABSTRACT

A peripheral bus switch that is adapted to connect together a pair of electrically independent peripheral buses to which arrays of peripheral devices (e.g. hard disk drives) are respectively connected in a peripheral bus interconnect system to ensure continuous access to all of the peripheral devices in the event that one of a pair of peripheral bus controllers which drive the peripheral buses should malfunction and require shutdown. The peripheral bus switch is a normally open switch that is connected between the pair of independent peripheral buses. In response to a malfunction, such that one of the pair of peripheral bus controllers fails to generate a timely health check report signal, the properly functioning peripheral bus controller will generate a power down signal to shut down the malfunctioning controller and a bus control signal to cause the normally open peripheral bus switch to close, whereby the properly functioning controller can access the arrays of peripheral devices connected to the pair of peripheral buses without interruption and as if no malfunction had occurred.

15 Claims, 2 Drawing Sheets

PERIPHERAL BUS SWITCH TO MAINTAIN CONTINUOUS PERIPHERAL BUS INTERCONNECT SYSTEM OPERATION

BACKGROUND OF THE INVENTION

1. Field of the Invention

This invention relates to a peripheral bus switch that is adapted to connect together a pair of electrically independent peripheral buses to which arrays of peripheral devices are respectively coupled in a peripheral bus interconnect system to ensure continuous and uninterrupted access to all of the peripheral devices in the event that the peripheral bus controller which drives one of the peripheral buses should malfunction and require shut down.

2. Background Art

A conventional peripheral bus interconnect system is described while referring to FIG. 1 of the drawings. In the conventional bus system, at least first and second peripheral buses 1 and 3 are shown to which first and second arrays of peripheral devices (each designated PD0 . . . PD6) are respectively connected. By way of example, such peripheral devices may include a CD drive, a DVD drive, a hard disk drive, and the like. In the case of FIG. 1, each of the peripheral buses 1 and 3 is electrically isolated and driven independently from one another.

Access to and control of the peripheral devices connected to the first peripheral bus 1 is accomplished by means of a first primary peripheral bus controller 5. Access to and control of the peripheral devices connected to the second peripheral bus 3 is accomplished by means of a second primary peripheral bus controller 7. In the event that one of the primary peripheral bus controllers 5 or 7 should fail, then all of the peripheral devices PD0 . . . PD6 which are connected to the corresponding peripheral bus 1 or 3 cannot be accessed or used. Consequently, at least part of the peripheral bus system in which the defective peripheral bus controller is included cannot be operated which adversely impacts the overall system performance and efficiency.

In order to overcome the negative effects of a defective primary peripheral bus controller, it has been known to add back-up or redundant peripheral bus controllers to the peripheral bus interconnect system. As shown in FIG. 1, a redundant peripheral bus controller 10 is coupled to and connected in electrical parallel with the primary bus controller 5, while a redundant peripheral bus controller 12 is coupled to and connected in electrical parallel with the primary bus controller 7. In this regard, only one of the primary or redundant bus controllers 5 or 10 and 7 or 12 will be used to operate and access the peripheral devices connected to their respective independent peripheral buses 1 or 3.

To accomplish the foregoing, each of the primary and redundant peripheral bus controllers 5, 7, 10 and 12 is provided with its own isolation circuitry 14, 16, 18 and 20. The purpose of the isolation circuitry is to automatically isolate a defective primary bus controller 5 or 7 from its peripheral bus, whereby the defective primary bus controller will be disconnected from its companion redundant bus controller. The redundant peripheral bus controller 10 or 12 will then be connected directly to one of the independent peripheral buses 1 or 3 so that normal operation will resume to enable the peripheral devices to be accessible with essentially no interruption of service or performance degradation.

While the aforementioned solution of redundant peripheral bus controller 10 and 12 has been found to maintain system performance, new problems of costs and space consumption are introduced at the same time. That is to say, the end user will be subject to the considerable cost of having to add a back-up or redundant peripheral bus controller to be coupled to each primary peripheral bus controller. Moreover, there is often insufficient space in a storage enclosure to house all of the redundant peripheral bus controllers that are necessary to implement a fully fail-safe peripheral bus interconnect system. Consequently, the solution shown in FIG. 1 is not acceptable in every case.

SUMMARY OF THE INVENTION

This invention relates to a peripheral bus switch for use in a peripheral bus interconnect system in which at least first and second peripheral bus controllers are connected to respective first and second electrically isolated and independently driven peripheral buses in order to control arrays of peripheral devices (e.g. CD ROM drives, DVD drives, hard disc drives, etc.) that are connected to the peripheral buses. In the event that one of the first or second peripheral bus controllers should malfunction, it may not be possible to drive the peripheral bus to which the malfunctioning bus controller is connected or to access and use the array of peripheral devices that are associated therewith. The peripheral bus switch of this invention is a normally open switch that is connected between the first and second peripheral buses. During normal operation, each of the first and second peripheral bus controllers sends regular health check report signals to the other. In the event of a failure, the normally functioning peripheral bus controller will fail to receive a timely health check report signal from the malfunctioning controller. In this case, the normally functioning peripheral bus controller will generate a power down input signal to shut down the power of the malfunctioning controller. The functioning peripheral bus controller will then generate a bus switch control signal by which to cause the normally open peripheral bus switch to close. Accordingly, the independent peripheral buses will now be connected to one another and to the normally functioning one of the peripheral bus controllers by way of the peripheral bus switch. By virtue of the foregoing, the normally functioning peripheral bus controller can drive each of the first and second peripheral buses so as to access all of the peripheral devices that are connected thereto without system interruption.

The first and second peripheral buses to which the arrays of peripheral devices are respectively connected are formed as signal traces over a peripheral bus panel that may include peripheral bus connectors so as to be removably received within a peripheral device enclosure. In this same regard, the peripheral bus switch of this invention can be implemented on a peripheral bus switch circuit board that may include complementary peripheral bus connectors so as to be housed within the same peripheral device enclosure and detachably connected to the signal traces on the peripheral bus panel. Therefore, it will be relatively easy to detachably interconnect the peripheral bus switch between the independent peripheral buses to achieve the fail safe benefits of this invention while minimizing both space consumption within the peripheral device enclosure and the corresponding cost to implement the interconnect system

DETAILED DESCRIPTION

Figure 1:
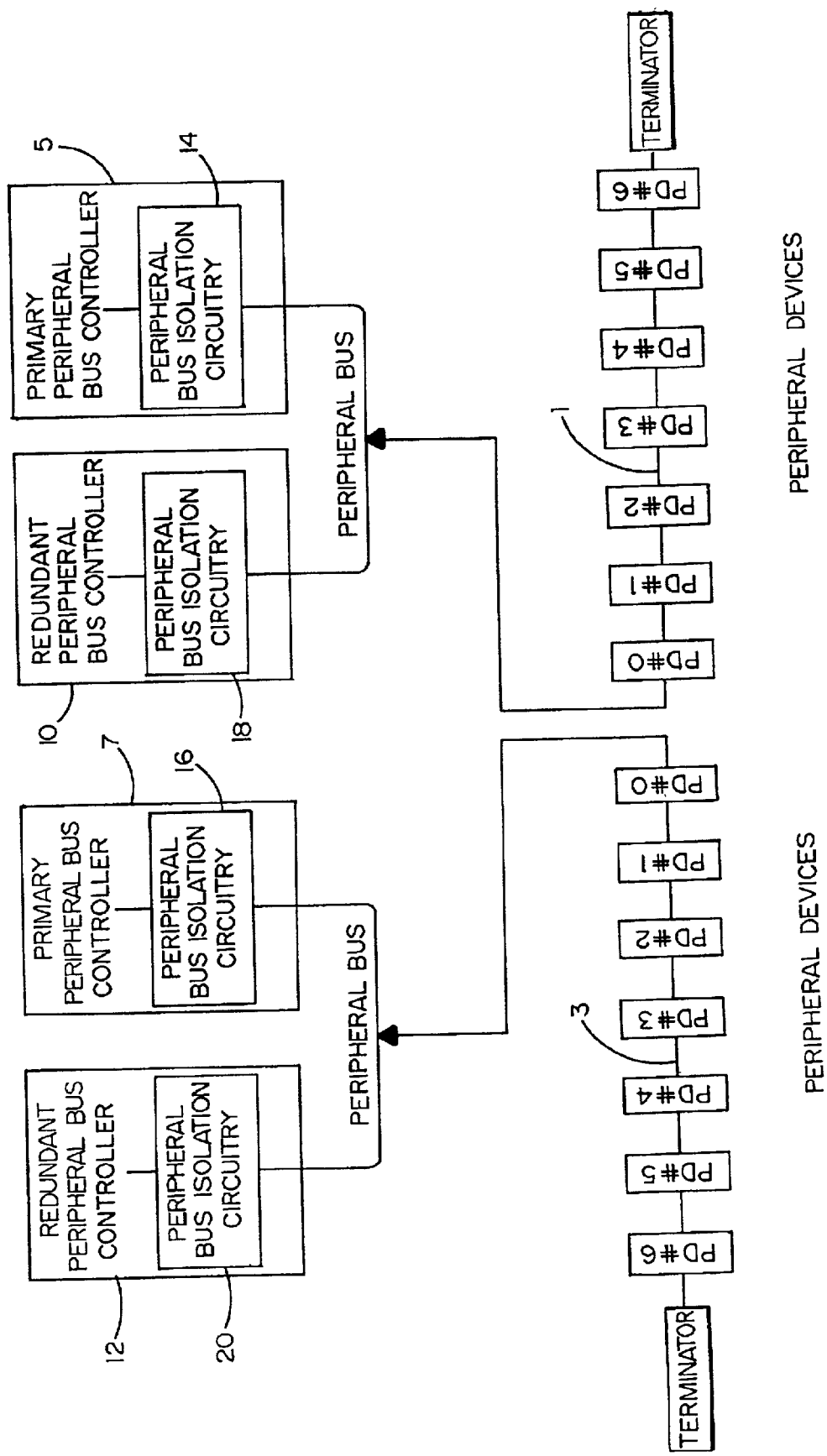
FIG. 1 is a block diagram representing a conventional peripheral bus interconnect system having independent peripheral buses driven by independent peripheral bus controllers.
Figure 2:
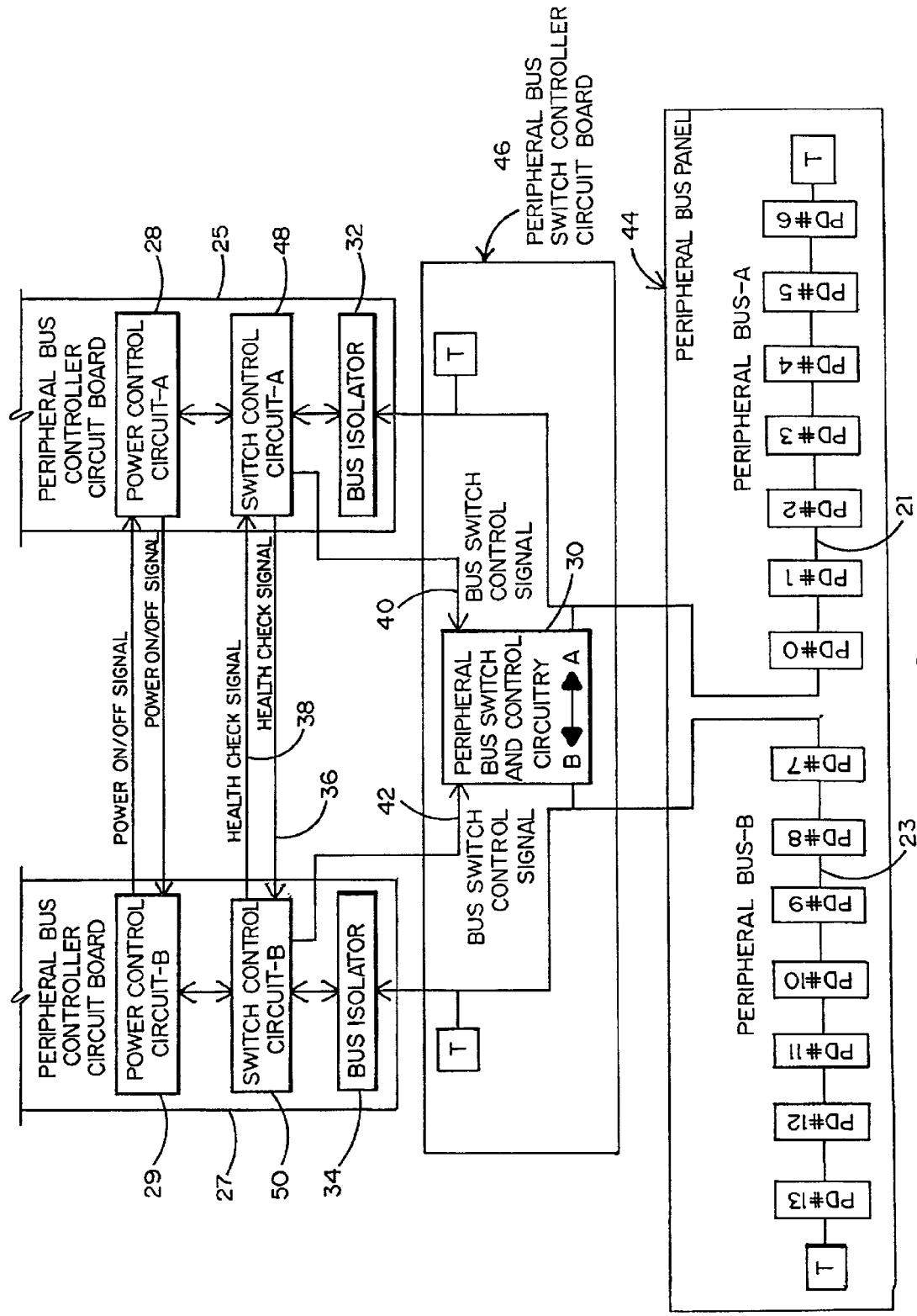
FIG. 2 is a block diagram representing a peripheral bus interconnect system having the peripheral bus switch which forms the present invention so as to ensure continuous and uninterrupted service in the event that a peripheral bus controller for driving one of the independent peripheral buses should malfunction and require shut down.

The high cost and space consumption problems that are inherent by using back-up or redundant peripheral bus controllers in the peripheral bus interconnect system of FIG. 1 are advantageously avoided by the peripheral bus interconnect system shown in FIG. 2 of the drawings. As in the system of FIG. 1, the peripheral bus interconnect system of FIG. 2 includes at least first and second peripheral buses 21 and 23 that are electrically isolated and driven independently from one another. First and second arrays of peripheral devices are respectively connected to the first and second peripheral buses 21 and 23. A pair of terminators (designated T) are located at the opposite ends of each bus 21 and 23 to reduce signal reflections and increase data integrity. Access to and control of the peripheral devices connected to the first peripheral bus 21 is accomplished by means of a first peripheral bus controller 25, and access to and control of the peripheral devices connected to the second peripheral bus 23 is accomplished by means of a second peripheral bus controller 27.

Unlike the system of FIG. 1, the peripheral devices (designated PD0 . . . PD6) connected to the first peripheral bus 21 must have an address which is unique from the addresses of the peripheral devices (designated PD7 . . . PD13) that are connected to the second peripheral bus 23 for a purpose that will be described in greater detail hereinafter. Depending upon the storage application of the peripheral bus interconnect system, any number of peripheral devices, including identical or different numbers of devices, can be connected to and accessed via the peripheral buses 21 and 23. By way of example, for data storage applications, where disk drive redundancy (such as disk mirroring) is required, the number of disk drives connected to each peripheral bus 21 and 23 must be identical.

In accordance with the improvement of this invention, a peripheral bus switch 30 is connected between the electrically independent peripheral buses 21 and 23. By virtue of the peripheral bus switch 30, either one of the first and second peripheral bus controllers 25 and 27 will be capable of accessing all of the peripheral devices PD0 . . . PD13 that are connected to both peripheral buses 21 and 23 in the event that the other one of the peripheral bus controllers suffers a malfunction and is no longer capable of accessing the peripheral devices via the peripheral bus to which the malfunctioning bus controller is connected. By way of particular example, the peripheral bus switch 30 herein described is an isolator switch such as that manufactured under Part No. INIC-525 by Initio Corporation.

More particularly the peripheral bus switch 30 is normally open during normal peripheral bus system operation, such that the peripheral buses 21 and 23 that are driven by the first and second bus controllers 25 and 27 remain electrically independent from one another. However, should one of the first or second peripheral bus controllers fail, then the normally open peripheral bus switch will close, whereby the peripheral buses 21 and 23 are connected to one another and to the still functioning peripheral controller so that all of the peripheral devices PD0 . . . PD13 can now be accessed by the same functioning peripheral bus controller.

During start-up and initialization of the system, either one of the first or second peripheral bus controllers 25 and 27 is powered up prior to the other by a power control circuit 28 or 29. At this time, the peripheral bus switch 30 is closed by a signal initiated by a switch control circuit 48 or 50 of the first to power up controller. That is, the bus controllers 25 and 27 are energized sequentially rather than simultaneously. Thus, during the start-up, the first to power up peripheral bus controller 25 or 27 will be conditioned to set or assign the addresses (i.e. drive identification recognition) and configure all of the peripheral devices PD0 . . . PD13 connected to both peripheral buses 25 and 27. It may now be appreciated that since all of the peripheral devices PD0 . . . PD13 are accessible during start-up by the same bus controller, each peripheral device must be assigned its own unique address. Thus, the bus controller 25 or 27 will have a record of the configuration information of each peripheral device. Such configuration information includes, but is not limited to, device address, motor spin options, and peripheral bus operation made options.

Each of the first and second peripheral bus controllers 25 and 27 has a bus isolator 32 and 34, such that the first to power up bus controller will be disconnected and isolated from both peripheral buses 21 and 23 once it has assigned the address and configuration options to all of the peripheral devices PD0 . . . PD13. Following the disconnection of the first to power up peripheral bus controller 25 or 27, the power control circuit 28 or 29 thereof will cause the other bus controller to power up. At this point, the last to power up bus controller is connected to both peripheral buses 21 and 23 by way of the peripheral bus switch 30 in order to obtain the address information, operational options and configurations of all of the peripheral devices PD0 . . . PD13 connected to buses 21 and 23 that were previously assigned and set up by the first to power up controller.

When both the first and second peripheral bus controllers 25 and 27 have finally powered up and the addresses, operational options and configurations needed to locate, access and control all of the peripheral devices PD0 . . . PD13 are assigned, the switch control circuit 48 or 50 of the last to power up controller initiates a signal to cause the peripheral bus switch 30 to return to its normally open switch condition. Therefore, the first and second peripheral bus controllers 25 and 27 will once again be adapted to work independently of one another so as to drive their respective peripheral buses 21 and 23 and access the peripheral devices PD0 . . . PD6 and PD7. . . PD13 connected thereto.

The independent operation of the first and second peripheral bus controllers 25 and 27 will continue provided that no malfunction occurs. During normal operation of the peripheral bus interconnect system of FIG. 2, the last to power up one of the first and second peripheral bus controllers 25 and 27 will send a first health check report signal 36 or 38 to the first to power up controller by which to indicate that the last to power up controller is operating normally and the peripheral bus switch 30 is in the open switch position. After receiving the health check signal 36 or 38, the first to power up controller 25 or 27 will deactivate its bus isolator 32 or 34. At this time, the first to power up controller sends its own health check signal 36 or 38 to the second to power up controller to indicate normal operation and connection to its peripheral bus 21 or 23.

Should one of the peripheral bus controllers 25 or 27 fail to receive a health check signal 36 or 38 from the other peripheral controller for a particular predetermined time (that is indicative of a malfunction), then the power control circuit 28 or 29 of the first peripheral controller will initiate a power down signal to force the malfunctioning controller to power down. The normally functioning controller will then initiate a bus switch control signal 40 or 42 so as to cause the normally open peripheral bus switch 30 to close and thereby connect the peripheral buses 21 and 23 together and to the normally functioning peripheral bus controller. Accordingly, all of the peripheral devices PD0 . . . PD13 connected to both peripheral buses 21 and 23 can be selectively accessed and operated by the same normally functioning peripheral bus controller without any loss of normal operation.

To enhance the compact nature and flexibility of the peripheral bus interconnect system of FIG. 2, those portions of the peripheral buses 21 and 23 to which the arrays of peripheral devices PD0 . . . PD6 and PD7 . . . PD13 re respectively connected can be formed as signal traces along a peripheral bus panel 44 to be housed within a peripheral bus enclosure (not shown). In this same regard, the peripheral bus switch 30 which is adapted to couple one of the peripheral bus controllers 25 or 27 to each of the peripheral buses 21 and 23 can be carried on the same peripheral bus panel 44 which also contains the signal traces or on a separate peripheral bus switch circuit board 46 that may also be housed within the peripheral bus enclosure. In the peripheral bus interconnect system of FIG. 2, the peripheral bus panel 44 and the peripheral bus switch circuit board 46 are shown as being permanently connected or hard wired together. However, the peripheral bus panel 44 and the peripheral bus switch circuit board 46 may also include complementary peripheral bus connectors (not shown) so as to be detachably connected to one another and removably received within and unplugged from the peripheral bus enclosure.

I claim:

1. A peripheral bus interconnect system, comprising:
   first and second peripheral bus lines that are electrically independent from one another;
   first and second arrays of peripheral devices respectively connected to said first and second peripheral bus lines;
   first and second controllers respectively connected to said first and second peripheral bus lines to drive said first and second bus lines in order to access and control the first and second arrays of peripheral devices connected thereto, said first and second controllers including control circuitry to send health status signals to each other to indicate the normal operation of said first and second controllers, said control circuitry being responsive to the absence of said health signals to indicate a malfunction of one of said first or second controllers; and
   a normally open switch located between said first and second peripheral bus lines and adapted to be closed to connect said first and second bus lines together in response to the absence of a health status signal from a malfunctioning of one of said first and second controllers, whereby the first and second arrays of peripheral devices are accessed and controlled by the normally functioning other one of said first and second controllers by way of said switch, malfunctioning of one of said first and second controllers, whereby the first and second arrays of peripheral devices are accessed and controlled by the normally functioning other one of said first and second controllers by way of said switch.

2. The peripheral bus interconnect system recited in claim 1, Wherein each peripheral device of said first array of peripheral devices has an address which is different from the address of each of the other peripheral devices of said first array and each peripheral device of said second array of peripheral devices.

3. The peripheral bus interconnect system recited in claim 2, wherein each of said first and second controllers includes a switch control circuit, one of said first and second controllers being powered up before the other and the switch control circuit of the first to power up controller causing said normally open switch to close, whereby said first to power up controller is connected to each of said first and second peripheral bus lines by way of said switch in order to assign the different addresses to and configure the first and second arrays of peripheral devices respectively connected to said first and second peripheral bus lines.

4. The peripheral bus interconnect system recited in claim 3, wherein each of said first and second controllers also includes a bus isolator the bus isolator of the first to power up controller causing said first to power up controller to be disconnected from said first and second peripheral bus lines following the assignment of the addresses to and the configure ion of the first and second arrays of peripheral devices respectively connected to said first and second peripheral 5. The peripheral bus interconnect system recited in claim 4, wherein each of said first and second controllers also includes a power control circuit, the second o said first and second controllers being powered up by the power control circuit thereof after the first one of said controllers is powered up, such that the second to power up controller is connected to each of said first and second peripheral bus lines by way of said switch so as to access the addresses and configurations of the first and second arrays of peripheral devices respectively connected to said first and second peripheral bus lines.

6. The peripheral bus interconnect system recited in claim 5, wherein the switch control circuit of the second to power up controller causes said normally open switch to open after said second to power up controller accesses the addresses and configurations of the first and second arrays of peripheral devices, whereby said first and second peripheral bus lines are disconnected from one another.

7. The peripheral bus interconnect system recited in claim 6, wherein the switch control circuit of the last to power up controller is adapted to send a health status signal to the switch control circuit of the first to power up controller to indicate that said last to power up controller is powered up and operating normally and that said normally open switch is open, the switch control circuit of said first to power up controller causing the bus isolator of said first to power up controller to be deactivated in response to the health status signal sent by said last to power up controller.

8. The peripheral bus interconnect system recited in claim 1, wherein each of said first and second peripheral bus lines is an electrical signal trace, said first and second arrays of peripheral devices respectively coupled to said first and second peripheral bus line at said electrical signal traces.

9. The peripheral bus interconnect system recite claim 8, wherein said electrical signal traces of said first and second peripheral bus lines are formed on a peripheral bus panel, said electrical signal traces being detachably connected to said normally switch.

10. A peripheral bus interconnect system, comprising:
    first and second peripheral bus lines that are electrically independent from one another;
    first and second arrays of peripheral devices respectively connected to said first and second peripheral bus lines;
    first and second controllers respectively connected to said first and second peripheral bus lines to drive said first and second bus lines in order to access and control the first and second arrays of peripheral devices connected thereto, each of said first and second controllers including a switch control circuit and a bus isolator; and
    a normally open switch located between said first and second peripheral bus lines and adapted to be closed to connect said first and second bus lines together in response to a malfunctioning one of said first and second controllers, whereby the first and second arrays of peripheral devices are accessed and controlled by the normally functioning other one of said first and second controllers by way of said switch,
    one of said first and second controllers being powered up before the other a d the switch control circuit of the first to power up controller causing said normally open switch to close temporarily, whereby said first to power up controller is connected to each of said first and second peripheral bus lines by way of said switch in order to assign addresses to and configure the first and second arrays of peripheral devices respectively connected to said first and second peripheral bus lines, and the bus isolator of the first to power up controller causing said first to power up controller to be disconnected from said first and second peripheral bus lines Following the assignment of the addresses to and the configuration of the first and second arrays of peripheral devices respectively connected to said first and second peripheral bus lines, whereupon the second to power up controller is connected to each of said first and second peripheral bus lines by way of said switch so as to access said first and second arrays of peripheral devices respectively connected thereto.

11. The peripheral bus interconnect system recited in claim 10, wherein each of said first and second controllers also includes a power control circuit, the second of said first and second controllers being powered up by the power control circuit thereof after the first one of said controllers is powered up, such that the second to power up controller is connected to each of said first and second peripheral bus lines by way of said switch so as to access the addresses and configurations of the first and second arrays of peripheral devices respectively connected to said first and second peripheral bus lines.

12. The peripheral bus interconnect system recited in claim 11, wherein the switch control circuit of the second to power up controller causes said normally open switch to open after said second to power up controller accesses the addresses and configurations of the first and second arrays of peripheral devices, whereby said first and second peripheral bus lines are disconnected from one another.

13. The peripheral bus interconnect system recited in claim 12, wherein the switch control circuit of the last to power up controller is adapted to send a health status signal to the switch control circuit of the first to power up controller to indicate that said last to power up controller is powered up and operating normally and that said normally open switch is open, the switch control circuit of said first to power up controller causing the bus isolator of said first to power up controller to be deactivated in response to the health status signal sent by said last to power up controller.

14. The peripheral bus interconnect system recited in claim 10, wherein each of said first and second peripheral bus lines is an electrical signal trace, said first and second arrays of peripheral devices respectively coupled to said first and second peripheral bus lines at said electrical signal traces.

15. The peripheral bus interconnect system recited in claim 14, wherein said electrical signal traces of said first and second peripheral bus lines are formed on a peripheral bus panel, said electrical signal traces being detachably connected to said normally open switch.

* * * * *